United States Patent
Huang et al.

(10) Patent No.: US 6,383,424 B1
(45) Date of Patent: May 7, 2002

(54) METHOD FOR PRODUCING FOAMS MADE OF POLYMERS OR POLYMER MIXTURES AND MOULDED ARTICLES MADE FROM SAID FOAMS

(75) Inventors: Quan Huang, Hamburg; Dieter Paul, Kleinmachnow; Bernd Seibig, Geesthacht, all of (DE)

(73) Assignee: Membrana GmbH, Wuppertal (DE)

( * ) Notice: Subject to any disclaimer, the term of this patent is extended or adjusted under 35 U.S.C. 154(b) by 0 days.

(21) Appl. No.: 09/830,346
(22) PCT Filed: Aug. 26, 1999
(86) PCT No.: PCT/DE99/02662
§ 371 Date: Aug. 29, 2001
§ 102(e) Date: Aug. 29, 2001
(87) PCT Pub. No.: WO00/26006
PCT Pub. Date: May 11, 2000

(30) Foreign Application Priority Data
Nov. 2, 1998 (DE) .......................................... 198 50 340

(51) Int. Cl.$^7$ ................................................ B29D 7/00
(52) U.S. Cl. ........................ 264/50; 264/45.8; 264/45.9; 264/51; 521/79; 521/80
(58) Field of Search ........................... 264/50, 51, 45.8, 264/459; 521/79, 80

(56) References Cited

U.S. PATENT DOCUMENTS

| 5,707,573 A | 1/1998 | Biesenberger et al. |
| 5,753,717 A | 5/1998 | Sanyasi |

*Primary Examiner*—Morton Foelak
(74) *Attorney, Agent, or Firm*—Oliff & Berridge, PLC

(57) ABSTRACT

A method using a two part process line is proposed for manufacturing foams from polymers or polymer mixtures useful for making molded bodies. The process line is divided into at least one first part and one second part. The polymer or polymer mixture is melted in the first part and a gas at a pressure increased relative to the melt pressure is added with the influence of a shearing and/or kneading device on the melted polymer or polymer mixture enriched with gas. In the second part of the process line, foam is formed from the gas-enriched polymer or polymer mixture at a higher pressure than the pressure in the first part of the process line. Membranes can be made from the molded bodies made by the method described above.

15 Claims, 3 Drawing Sheets

METHOD FOR PRODUCING FOAMS MADE OF POLYMERS OR POLYMER MIXTURES AND MOULDED ARTICLES MADE FROM SAID FOAMS

BACKGROUND OF THE INVENTION

1. Field of the Invention

The invention relates to a method for manufacturing foams, especially microcellular foams, from polymers or polymer mixtures for shaping molded bodies whereby the polymers or polymer mixtures are melted on the assembly line before they are passed through a shaping device in an extruder device and foam formation takes place by introducing a gas, as well as molded bodies manufacturable by means of the method.

2. Discussion of Related Art

Such a method by which the widest variety of molded bodies can be made by melting extrusion with the aid of a foam-forming gas have been known for a long time for a very wide variety of applications. The previous methods however are regularly characterized by the fact that the energy expenditure to work the method was and is very great. For example, a method is known from DE-OS 44 37 800 in which the pressure load in the extrusion device therein is constant over the temperature that is different in two zones so that an impregnation of the melt with a foam-forming gas is not possible.

From DE-OS 44 37 860, a method is known for manufacturing sheets of web-microcellular foams from amorphous thermoplastic plastic by impregnation of a plastic melt with a volatile propellant in which, in a first extrusion zone, the thermoplast is impregnated at a temperature above its glass temperature with a propellant and in which, in a second extrusion zone, the propellant-containing melt is cooled to a temperature that is above the glass temperature of the propellant-containing thermoplast. The propellant-containing melt is thereby cooled by at least 40° C. to a temperature that is at least 30° C. above the glass temperature of the propellant-containing thermoplast.

In other methods for manufacturing foams from polymers, so-called nucleating agents, in the form of talcum or zeoliths for example, or an additional gas, are necessary.

SUMMARY OF THE INVENTION

Overall, the previous methods are not capable either because of their regularly high energy consumption and/or possible additional means for initiating the formation of foam and are not able to produce satisfactory results relative to the products made by the method, so that it is the goal of the present invention to provide a method of the type described at the outset with which molded bodies can be made continuously with an energy requirement that is very low and free of additional substances or materials, i.e., in a continuous process whereby the method is intended to be able to produce both open-celled and closed molded bodies and with which an adjustment of the pore size is possible with considerable and desired accuracy and whereby the method is simple and can be performed economically by comparison with the known methods.

This goal is achieved according to the invention by the fact that the process line is divided into at least a first part and a second part whereby in the first part, the melt of the polymer or polymer mixture and the addition of the gas with pressure greater than the melt takes place under the influence of a shearing and/or kneading and/or homogenization means on the polymer or polymer mixture charged with gas and whereby, at the end of the second part of the process line following the first part, foam formation of the gas-charged polymer or polymer mixture having a higher pressure than the pressure in the first part takes place.

The advantage of the method according to the invention consists essentially in the fact that the segmentation chosen according to the invention in lower pressure and higher temperature-influenced zones and in higher pressure and lower temperature-influenced zones makes possible the high solubility of the gas. This therefore permits optimum foam formation whereby the amount of gas in the melt which can be adjusted in volume according to the desired property of molded bodies manufactured according to the method, makes possible by the resultant reduction in the viscosity of the melt, a reduction of the torque to be used, and therefore a reduction of the energy consumption for working the method or a device with which the method can be performed.

The advantage of the method according to the invention also lies in the fact that, by dividing or segmenting the process line, the process of foam formation can be influenced under control, while, before the pressure of the melt is increased, the polymer or polymer mixture is melted and the gas can be introduced and after the pressure is increased in the area between the pressure-increasing means and the shaping device, foam formation, especially microcellular foam formation, can take place under control.

In an advantageous embodiment of the method, the temperature of the gas introduced into the first part of the process line is greater than the glass or melting temperature of the polymer or of the polymer mixture so that the gas introduced initially can distribute itself very well in the polymer or polymer mixture melt. The temperature in this process line is then advantageously chosen so that immediately after adding the gas, in other words the actual mixing process of the gas into the polymer or the polymer mixture, further treatment of the gas-charged polymer or polymer mixture melt advantageously takes place with respect to the above-mentioned shearing, kneading, and homogenization process while retaining the melting temperature of the polymer or polymer mixture.

The pressure of the gas introduced into the polymer or polymer mixture melt preferably is greater than 150 bars, whereby the solubility of the gas introduced into the polymer or polymer mixture melt is increased.

Preferably, the temperature of the gas-enriched polymer or polymer mixture between the second part of the process line and the shaping device is reduced relative to the temperature of the gas-enriched polymer or polymer mixture in the first part of the process line, whereby it is also advantageous to increase the pressure of the gas-enriched polymer or polymer mixture between the second part and the shaping device relative to the pressure of the gas-enriched polymer or polymer mixture in the first part of the process line. The pressure increase at the end of the first part of the process line by pressure-increasing means, for example in the form of a gear melt pump, makes it possible to reduce the temperature of the gas-charged polymer or polymer mixture melt so that a change in viscosity can be effected in a wide range.

Advantageously, the pressure of the gas-enriched polymer or polymer mixture between the second part of the process line and the shaping device is in the range of up to 1500 bars, and preferably at least 500 bars. Experiments have shown that such pressures are sufficient for a completely homogeneous dissolution of the gas in the polymer or polymer mixture melt, whereby preferably the temperature in this area is up to 150° C. below the temperature in the first part of the process line.

The adjustment of pressure in the first and/or second part of the process line is preferably adjusted as a function of the type of polymer or polymer mixture and/or a desired pore structure (pore size, open pores, closed pores), whereby all amorphous thermoplastic and partially crystalline polymers, copolymers, and polymer blends such as polycarbonate, polysulfone, polyethersulfone, polypropylene, polyethylene, polyamide, polyester, PVDF, etc., can be used as the polymers and whereby the polymer mixtures can be mixtures of the polymers mentioned above, for example.

In addition to adjusting the pressure, it is likewise advantageous to adjust the temperature of the polymer or the polymer mixture, i.e., its melts and/or gas-enriched melts, in the first and/or second part of the process line, possibly as a function of the type of polymer or of the polymer mixture and/or a desired pore structure, in order to obtain an optimum result for the respective polymer and/or polymer mixture and/or the resultant product with respect to the type of pores (closed, open) and the size of the pores, which simultaneously can serve to reduce energy consumption.

BRIEF DESCRIPTION OF THE DRAWINGS

A molded body (product) manufactured by the method according to the invention is preferably a membrane, as is used in many methods of separating media mixtures (liquid, gaseous). Preferably, the molded bodies can be formed by the method according to the invention in the form of a flat membrane or also advantageously in the form of a hollow fiber membrane.

The invention will now be described with reference to the attached schematic drawings with reference to an embodiment.

DESCRIPTION OF PREFERRED EMBODIMENTS

Figure 1:
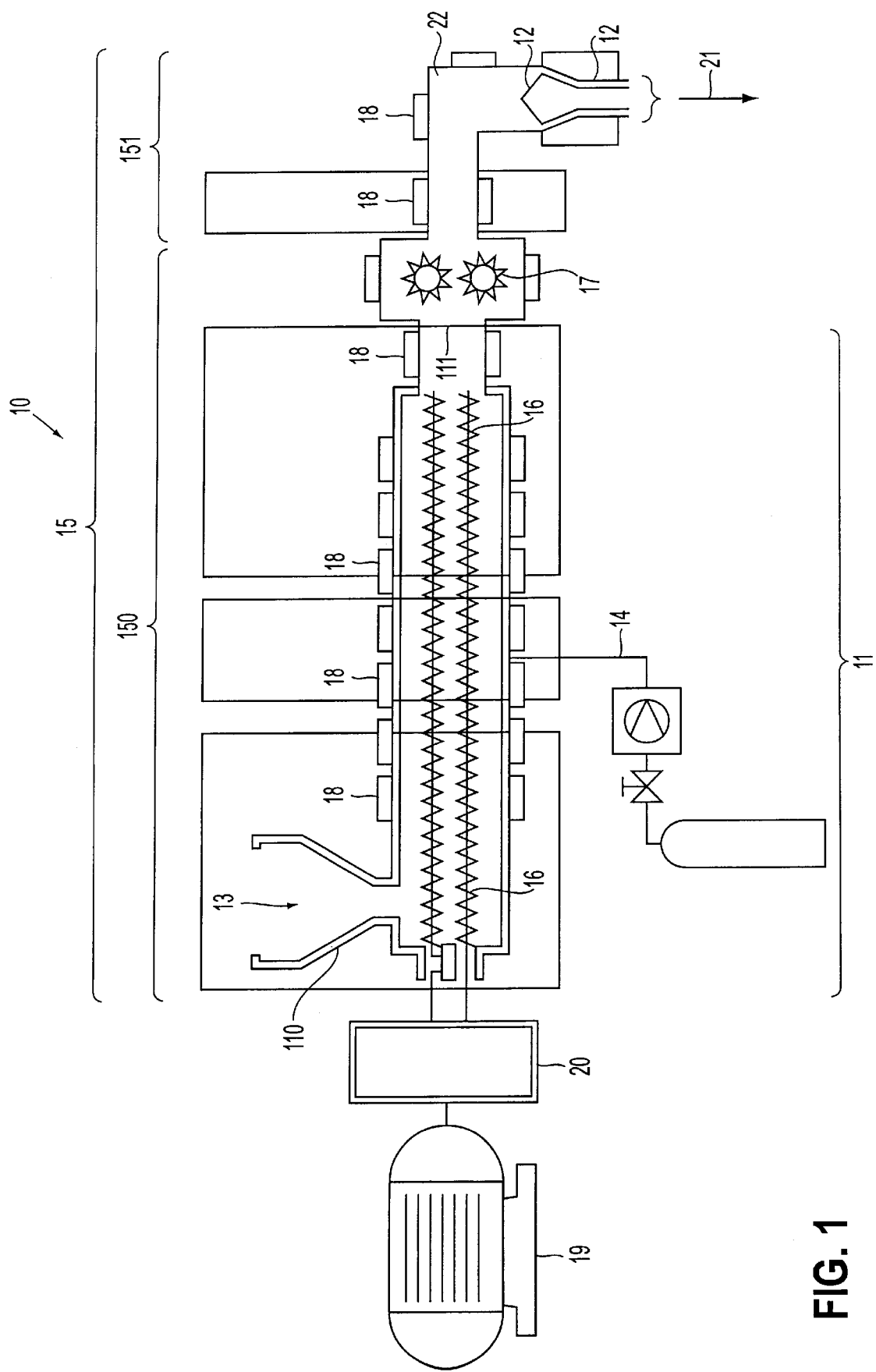
FIG. 1 shows the schematic design of a device by which the method according to the invention can be worked for making molded bodies, for example in the form of flat membranes, hollow fiber membranes, or for making other shaped bodies.

The method according to the invention can be worked with a device 10 shown in FIG. 1. For this reason, device 10 will be described first.

Device 10 essentially comprises an extruder device 11 formed by an elongate extruder body in which shearing/kneading/homogenization devices 16 are located in a known fashion, for example in the manner of a familiar screw conveyor, whereby means in the present case in the form of a polymer or polymer mixture 13, which are added in a funnel-shaped inlet 110 to extruder device 11 are conveyed within the extruder device 11 to an outlet 111 which is opposed to the inlet 110. The device 10 has a drive motor 19 and possibly a gear 20 by which the shearing/kneading device or shearing/kneading devices 16 are rotatably coupled with the drive motor 19. Gear 20, for example, can be a planetary gear.

Temperature control devices 18 are located around the elongate body of extruder device 11, and can be cooling and/or heating devices.

In a middle part of extruder device 11 is located an opening to supply gas 14 to extruder device 11.

Directly at the outlet 111 of extruder device 11, there is a pump 17 in the form of a gear pump. The extruder device 11, together with pump 17, forms a first part 150 of the process line 15 in the method according to the invention.

Following pump 17 a second part 151 of process line 15 is formed with a head 22, on whose outlet-side end a shaping device 12 is located, with which molded bodies in the form of flat membranes, hollow fiber membranes, and other desired shaped bodies can be made, for example. The exit of the shaped body/product 21 from device 10 at the end of the device of the method according to the invention is symbolized by arrow 21. In addition, head 22 can have temperature control devices 18 with which the gas-enriched polymer or polymer mixture 13 enriched with gas inside head 22 can be subjected to suitable temperature control.

The method according to the invention then operates as follows using the device 10 described above.

A polymer or polymer mixture 13, which is for example in the form of a granulate, is added through funnel-shaped inlet 110, the extruder device 11 belonging to the first part 150 of process line 15, whereby in this part 150 the polymer or polymer mixture 13 is initially melted. The melting temperature is, for example in the case of a polymer such as polycarbonate, 290° C. Driven by drive motor 19, the molten polymer or polymer mixture is conveyed by the screw conveyor in the form of shearing/kneading/homogenizing device 16 for example, into the zone of extruder device 11, into which gas 14 is introduced at high pressure, for example 150 bars.

The rotating shearing/kneading/homogenization device 16 prevents the gas from settling above the melt of the polymer or polymer mixture 13. Instead, gas 14, which can be $CO_2$ for example, is mixed optimally into the melt by the rotating shearing/kneading/homogenization device 16 so that nearly complete dissolution of the gas in the melt takes place. The temperature of the gas-enriched melt in the extruder device 11 is lowered relative to the original melting temperature by the additional temperature control means 18 located after the position of gas introduction at the extruder device 11 and kept essentially constant to the outlet 111, whereby the lowering of the temperature, for example relative to the melt temperature of 290° C. to 225° C., takes place in a polymer formed by polycarbonate. In the last section of the first part 150 of the process line, by means of pump 17 (gear melt pump), which forms a pressure barrier for the following second part 151 of the process line 15, there is a considerable increase of the gas-enriched polymer or polymer mixture melt pressure, i.e., in head 22 which is made tubular. In head 22, because of the pressure increase, there is another increase in the dissolution of the gas in the polymer or in the polymer mixture melt. The result is that the temperature control devices 18, located in the second part 151 of the process line 15, i.e., in the tubular head 22, can be used to reduce the temperature of the gas-enriched melt made of polymer or polymer mixture 13.

As a result of the activity of pump 17, the gas-enriched polymer or polymer mixture melt 13, raised to 1500 bars or more in head 22, is pushed out of the shaping device 12 so that at least after the gas-enriched polymer or polymer mixture melt 13 emerges from the shaping device 12, the polymer or polymer mixture foam emerges, for example as a flat membrane or hollow fiber membrane, following suitable shaping by shaping device 12.

All the pressures and temperatures of the polymer or the polymer gas mixture 13, including the gas 14, are suitably adjustable to the polymer or the polymer mixture 13 used and optimizable by means of the above-mentioned devices used, such as pump 17, shearing/kneading/homogenizing (mixing) device 16, and temperature control means 18 (cooling, heating).

EXAMPLE

Figure 2:
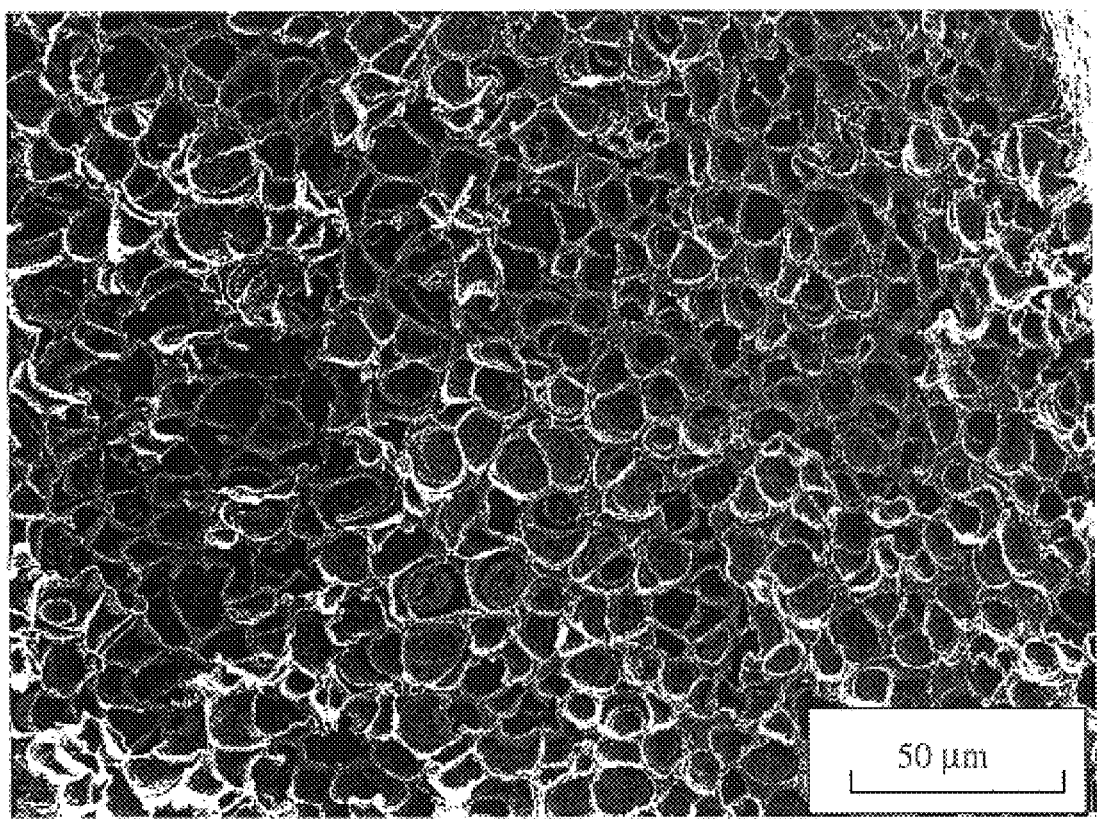
FIG. 2 shows the closed pore structure of a molded body made by the method according to the invention.

In a uniform double-screw extruder with a geometry of 25 mm inside diameter and an L/D ratio of 32 D, a polycarbonate granulate was melted at 290° C. and subjected under a pressure of 140 bars with 8 wt. % $CO_2$ (FIG. 1). The polycarbonate used has a melted volume index MVI (300° C./1.2 kg) of 9.5 ml/10 min. In the five extruder segments following the gas injection point, the melt temperature was lowered corresponding to the dissolved volume of gas in the polymer to 225° C. The pressure is increased in the connected gear melt pump to about 650 bars. Under these pressure conditions, the solubility of the gas is increased further so that the melting temperature in this segment can be reduced to 170° C. At the outlet of an annular hollow fiber nozzle, an open-celled polycarbonate foam appears with an average cell size of 10 $\mu$m and a cell density of $2 \times 10^9$ cells/$cm^3$ (FIG. 2). The permeability of $N_2$ is 1.2 $m^3/m^2 \cdot h \cdot bar$, that of $O_2$ is 1.1 $m^3/m^2 \cdot h \cdot bar$, and of He is 2.2 $m^3/m^2 \cdot h \cdot bar$.

Figure 3:
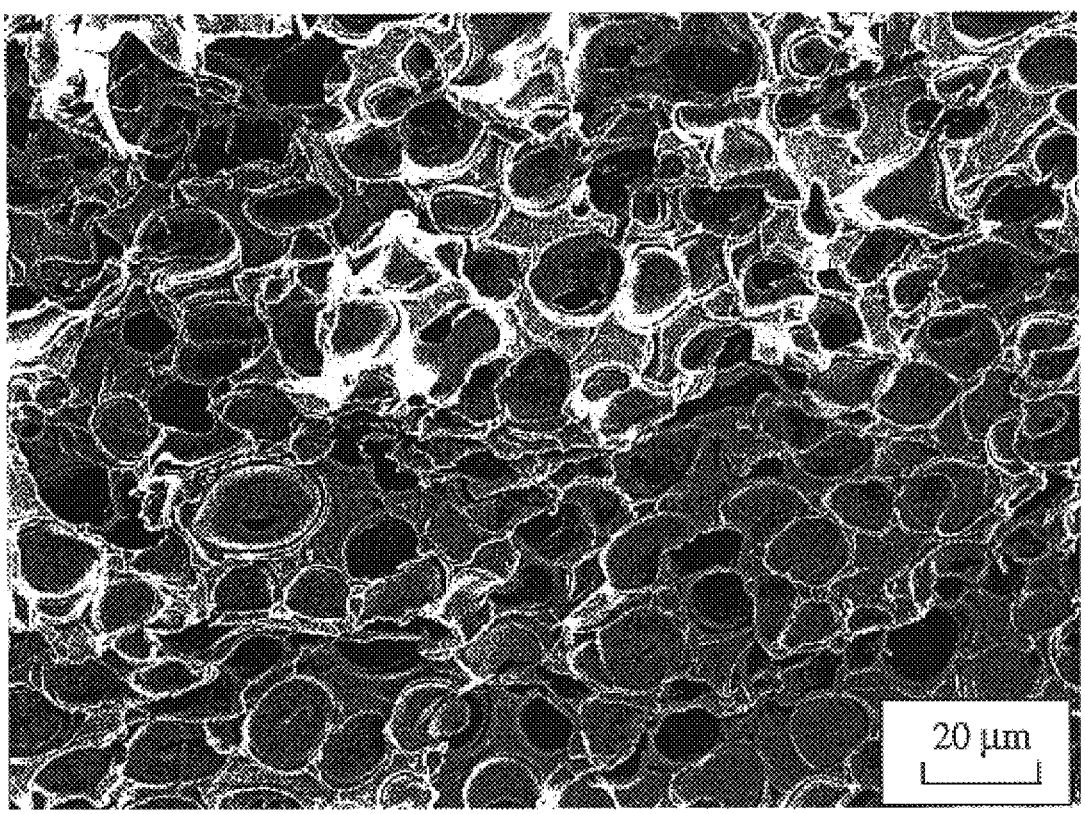
FIG. 3 shows the open pore structure of a molded body made by the method according to the invention.

When the melt pressure is 320 bars instead of 650 bars as mentioned above in this segment under the above-described experimental conditions with the same experimental arrangement, there occurs at the outlet of an annular hollow fiber nozzle a polycarbonate foam with a predominantly closed structure. The average cell size in this hollow fiber is then 13 $\mu$m and the cell density is $7 \times 10^8$ cells/$cm^3$ (FIG. 3).

LIST OF REFERENCE NUMERALS

10 Device
11 Extruder device
110 Inlet
111 Outlet
12 Shaping device
13 Polymer/polymer mixture
14 Gas
15 Process line
150 First part
151 Second part
16 Shearing/kneading/homogenization device
17 Pump
18 Temperature control device (cooling, heating)
19 Drive motor
20 Gear
21 Shaped body/product
22 Head

What is claimed is:

1. A method for manufacturing foam from a polymer or a polymer mixture, comprising:
    melting the polymer or the polymer mixture in an extruding device of a first part of a process line under a first pressure;
    enriching the melted polymer or the melted polymer mixture with a gas at a gas pressure in the first part of the process line while influencing the melted polymer or the melted polymer mixture with at least one shearing, mixing, or kneading device, wherein the gas pressure is higher than the first pressure; and
    forming the foam from the gas enriched melted polymer or melted polymer mixture at the end of a second part of the process line following the first part while the gas enriched polymer or polymer mixture at the end of the second part of the process line has a second pressure that is higher than the first pressure.

2. The method according to claim 1, wherein a temperature of the gas for enriching the melted polymer or the melted polymer mixture is higher than a glass or melting temperature of the polymer or the polymer mixture.

3. The method according to claim 1, wherein the process of enriching the polymer or the polymer mixture with the gas occurs while maintaining a melting temperature of the polymer or polymer mixture.

4. The method according to claim 1, wherein the gas pressure of the gas is more than 150 bars.

5. The method according to claim 1, wherein a temperature of the gas-enriched melted polymer or the melted polymer mixture between the second part of the process line and a shaping device is reduced with respect to a temperature of the gas-enriched melted polymer or the melted polymer mixture in the first part of the process line.

6. The method according to claim 1, wherein the increase in pressure from the first part of the process line to the second part of the process line is effected at the end of the first process line with a gear pump.

7. The method according to claim 1, wherein the second pressure is about 1500 bars or less.

8. The method according to claim 1, wherein the first pressure, second pressure and gas pressure are adjusted as a function of a composition of the polymer or the polymer mixture, a desired pore structure, or both.

9. The method according to claim 1, wherein a temperature of the gas and a temperature of the gas-enriched melted polymer or melted polymer mixture in the first part of the process line or second part of the process line or both parts of the process line is adjusted as a function of a composition of the polymer or the polymer mixture, a desired pore structure, or both.

10. The method according to claim 1, wherein at the end of the second part of the process line, the foam is shaped into a molded body in a shaping device.

11. The method according to claim 10, wherein the molded body is a membrane.

12. The membrane according to claim 11, wherein the membrane has a microcellular structure of 0.5 to 15 $\mu$m and a wall thickness of 0.025 to 100 mm.

13. The molded body according to claim 10, wherein the molded body is a flat membrane.

14. The molded body according to claim 10, wherein the molded body is a hollow fiber membrane.

15. The method according to claim 1, wherein the foam is a microcellular foam.

* * * * *